United States Patent
Kleber et al.

(10) Patent No.: US 9,479,615 B1
(45) Date of Patent: Oct. 25, 2016

(54) SYSTEMS AND METHODS FOR PROVIDING INTERSTITIAL CONTENT

(71) Applicant: Google Inc., Mountain View, CA (US)

(72) Inventors: Michael Kleber, Mountain View, CA (US); Mathieu Gagne, Mountain View, CA (US); Nathan Peter Lucash, Mountain View, CA (US); Johan Land, Mountain View, CA (US); Jonathan Frank Guarino, Mountain View, CA (US)

(73) Assignee: Google Inc., Mountain View, CA (US)

( * ) Notice: Subject to any disclaimer, the term of this patent is extended or adjusted under 35 U.S.C. 154(b) by 188 days.

(21) Appl. No.: 14/170,124

(22) Filed: Jan. 31, 2014

(51) Int. Cl.
  *G06F 15/16* (2006.01)
  *H04L 29/06* (2006.01)

(52) U.S. Cl.
  CPC .................................... *H04L 67/42* (2013.01)

(58) Field of Classification Search
  None
  See application file for complete search history.

(56) References Cited

U.S. PATENT DOCUMENTS

| | | | | |
|---|---|---|---|---|
| 6,237,022 B1 * | 5/2001 | Bruck | ...................... | H04L 29/06 709/200 |
| 6,268,856 B1 * | 7/2001 | Bruck | ............... | G06F 17/30899 707/E17.119 |
| 6,317,791 B1 * | 11/2001 | Cohn | ................ | G06F 17/30902 707/E17.12 |
| 2001/0044832 A1 * | 11/2001 | Cohn | ...................... | H04L 29/06 709/217 |
| 2001/0044846 A1 * | 11/2001 | Cohn | ................ | G06F 17/30902 709/227 |
| 2002/0120666 A1 * | 8/2002 | Landsman | ............. | G06Q 30/02 709/200 |
| 2007/0271370 A1 * | 11/2007 | Kehl | ...................... | G06Q 30/02 709/224 |
| 2008/0208684 A1 * | 8/2008 | Hamilton | ............... | G06Q 30/02 705/14.61 |

* cited by examiner

*Primary Examiner* — Brian P Whipple
(74) *Attorney, Agent, or Firm* — Foley & Lardner LLP; John D. Lanza

(57) ABSTRACT

Systems and methods for providing interstitial content are disclosed. A notification of an opportunity for presenting interstitial content on a client device is received at a content server. The content server generates an interstitial configuration object including computer-readable instructions for presenting the interstitial content on the client device and delivers the interstitial configuration object for execution by the client device. The interstitial configuration object causes the client device to render the interstitial content as a hidden element of a first resource while the first resource is presented on the client device and to reveal the rendered interstitial content in response to a user command to navigate away from the first resource.

18 Claims, 4 Drawing Sheets

SYSTEMS AND METHODS FOR PROVIDING INTERSTITIAL CONTENT

BACKGROUND

The Internet provides access to a wide variety of content. Publishers of webpages and other types of first-party content often monetize their content by allowing sponsored third-party content (e.g., advertisements) to be integrated therewith. A programmatic Internet advertising system can be used to automate the selection and integration of third-party content with the first-party content. In certain programmatic Internet advertising systems, third-party content providers (e.g., advertisers) may be notified of an available impression (i.e., an opportunity to display an advertisement in conjunction with a webpage) and allowed to bid on the impression.

Interstitial content is a type of online content that is often displayed between webpages. Interstitial content can be used to introduce another page or site, to inform a user that the next page requires a login or is part of a different domain, to display advertisements, or for a variety of other informational and/or promotional uses. Interstitial content can include advertisements which are displayed temporally between two webpages. When a user clicks a link from a first webpage to a second webpage, an interstitial advertisement may be shown to the user before the second webpage is displayed. Interstitial advertisements can be very effective due to the full share-of-voice provided to advertisers.

One approach used by previous systems for presenting interstitial content is to load and render the interstitial content in response to a user clicking a link from a first webpage to a second webpage. Such an approach can result in substantial latency and delays the second webpage by the time spent loading and rendering the interstitial content. Another approach used by previous systems is to load the interstitial content after rending the content of the second webpage. In this approach, the interstitial content is presented over the publisher's content when the interstitial content is fully loaded (e.g., in a pop-up window). Both of these approaches offer a poor user experience and can result in high bounce rates.

SUMMARY

One implementation of the present disclosure is a method for presenting interstitial content. The method includes receiving, at a content server, a notification of an opportunity for presenting interstitial content on a client device, generating, by the content server, an interstitial configuration object comprising computer-readable instructions for presenting the interstitial content on the client device, and delivering the interstitial configuration object for execution by the client device. The interstitial configuration object causes the client device to render the interstitial content as a hidden element of a first resource while the first resource is presented on the client device and to reveal the rendered interstitial content in response to a user command to navigate away from the first resource.

In some implementations, rendering the interstitial content as a hidden element includes rendering the interstitial content in an invisible frame of the first resource while the first resource is presented on the client device. In some implementations, revealing the rendered interstitial content includes modifying the invisible frame to become visible in response to the user command to navigate away from the first resource.

In some implementations, the user command to navigate away from the first resource is a command to navigate from the first resource to a second resource. The interstitial configuration object may cause the client device to automatically navigate to the second resource after the interstitial content is presented on the client device. In some implementations, the interstitial configuration object causes the client device to pre-render the second resource in response to revealing the rendered interstitial content.

In some implementations, the interstitial configuration object causes the client device to modify an element of the first resource to include a click event handler. The click event handler may cause the client device to cancel navigation to a second resource associated with the modified element and to reveal the rendered interstitial content in response a user command selecting the modified element.

In some implementations, the method further includes determining whether the user command to navigate away from the first resource is a command to navigate to a second resource on a same domain as the first resource. The interstitial configuration object may cause the client device to reveal the rendered interstitial content in response to a determination that the user command to navigate away from the first resource is a command to navigate to a second resource on the same domain as the first resource.

In some implementations, the method further includes receiving, at the content server, a request for non-interstitial content from the client device. The request for non-interstitial content may include the notification of the opportunity for presenting interstitial content on the client device. The method may further include delivering a non-interstitial content item to the client device in conjunction with the interstitial configuration object. The interstitial configuration object may cause the client device to display the non-interstitial content item concurrently with the first resource.

In some implementations, the method further includes receiving, at the content server, a request for interstitial content from the client device. The request for interstitial content may be received in response to at least one of the client device executing the interstitial configuration object, or the client device executing an interstitial content request tag of the first resource.

In some implementations, the method further includes retrieving, by the content server, configuration settings from a data storage device. The configuration settings may be adjustable by a publisher of the first resource. The method may further include using the configuration settings to determine whether the publisher has elected to display interstitial content in conjunction with the first resource. Generating the interstitial configuration object may be performed in response to a determination that the publisher has elected to display interstitial content in conjunction with the first resource.

In some implementations, the method further includes determining, by the content server, a frequency with which interstitial content has been presented on the client device. Generating the interstitial configuration object may be performed in response to a determination that the frequency with which interstitial content has been presented on the client device does not exceed a frequency threshold.

In some implementations, the interstitial configuration object causes the client device to determine a frequency with which interstitial content has been presented on the client device. The interstitial configuration object may cause the client device to render the interstitial content and to reveal the rendered interstitial content in response a determination that the frequency with which interstitial content has been presented on the client device does not exceed a frequency threshold.

In some implementations, the interstitial configuration object causes the client device to determine the frequency with which interstitial content has been presented on the client device in response to the user command to navigate away from the first resource.

Another implementation of the present disclosure is a system for presenting interstitial content. The system includes a computing system configured to receive a notification of an opportunity for presenting interstitial content on a client device, generate an interstitial configuration object including computer-readable instructions for presenting the interstitial content on the client device, deliver the interstitial configuration object for execution by the client device, render the interstitial content as a hidden element of a first resource while the first resource is presented on the client device, and reveal the rendered interstitial content in response to a user command to navigate away from the first resource.

In some implementations, the user command to navigate away from the first resource is a command to navigate from the first resource to a second resource. In some implementations, the computing system is configured to automatically navigate to the second resource after the interstitial content is presented on the client device.

In some implementations, the computing system is configured to modify an element of the first resource to include a click event handler. In some implementations, the computing system is configured to cancel navigation to a second resource associated with the modified element and to reveal the rendered interstitial content in response a user command selecting the modified element.

In some implementations, the computing system is configured to determine whether the user command to navigate away from the first resource is a command to navigate to a second resource on a same domain as the first resource. In some implementations, the computing system is configured to reveal the rendered interstitial content in response to a determination that the user command to navigate away from the first resource is a command to navigate to a second resource on the same domain as the first resource.

In some implementations, the computing system is configured to determine whether interstitial content presentation frequency exceeds a frequency threshold and to reveal the rendered interstitial content in response a determination that the interstitial content presentation frequency does not exceed the frequency threshold.

Another implementation of the present disclosure is a system for providing interstitial content. The system includes a content server configured to generate an interstitial configuration object comprising computer-readable instructions for presenting interstitial content on a client device and to deliver the interstitial configuration object for execution by the client device. The interstitial configuration object causes the client device to render the interstitial content as a hidden element of a first resource while the first resource is presented on the client device and to reveal the rendered interstitial content in response to a user command to navigate away from the first resource.

In some implementations, rendering the interstitial content as a hidden element includes rendering the interstitial content in an invisible frame of the first resource while the first resource is presented on the client device. In some implementations, revealing the rendered interstitial content comprises modifying the invisible frame to become visible in response to the user command to navigate away from the first resource.

In some implementations, the interstitial configuration object causes the client device to modify an element of the first resource to include a click event handler. The click event handler may cause the client device to cancel navigation to a second resource associated with the modified element and to reveal the rendered interstitial content in response a user command selecting the modified element.

The foregoing is a summary and thus by necessity contains simplifications, generalizations, and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Referring generally to the FIGURES, systems and methods for providing interstitial content are shown, according to a described implementation. Interstitial content can include advertisements which are displayed temporally between two resources (e.g., between two webpages). When a user clicks a link from a first webpage to a second webpage, an interstitial advertisement may be shown to the user before the second webpage is displayed. Interstitial advertisements can be very effective due to the full share-of-voice provided to advertisers. Interstitial content can also be used to introduce another page or site, to inform a user that the next page requires a login or is part of a different domain, or for a variety of other informational and/or promotional uses.

The systems and methods described herein can be used to present interstitial content without impacting browsing latency and without interrupting a browsing activity (e.g., reading an article, playing a game, etc.). In brief overview, the interstitial content is loaded asynchronously with respect to content of a first resource (e.g., a webpage that a user is currently viewing). While the user is viewing the first resource, the interstitial content may be fully rendered as a hidden element on the first resource (e.g., in an invisible frame). The rendered interstitial content may remain invisible until a user command to navigate away from the first resource is received.

When the user initiates navigation away from the first resource (e.g., by clicking a link to a second resource), the fully-rendered interstitial content may be revealed. The interstitial content may be presented, in some implementations, in an overlay frame which is modified to become visible in response to the user command to navigate away from the first resource. After the interstitial content is displayed, the user's browser may be automatically directed to a second resource. The second resource may be a webpage associated with the link which caused the interstitial content to be revealed. Upon revealing the interstitial content, any available browser technology (e.g. prefetching, pre-rendering, etc.) can be used to expedite display of the second resource. In some implementations, some or all of the second resource can be loaded and/or rendered while the interstitial content is displayed.

If the user does not click on a link (e.g., if the user closes the browser window or clicks the "back" button) the interstitial content may be abandoned and left unviewed. The interstitial content may represent a potential impression when rendered invisibly. The potential impression may be converted into an actual impression when the interstitial content is revealed and presented to the user.

Figure 1:
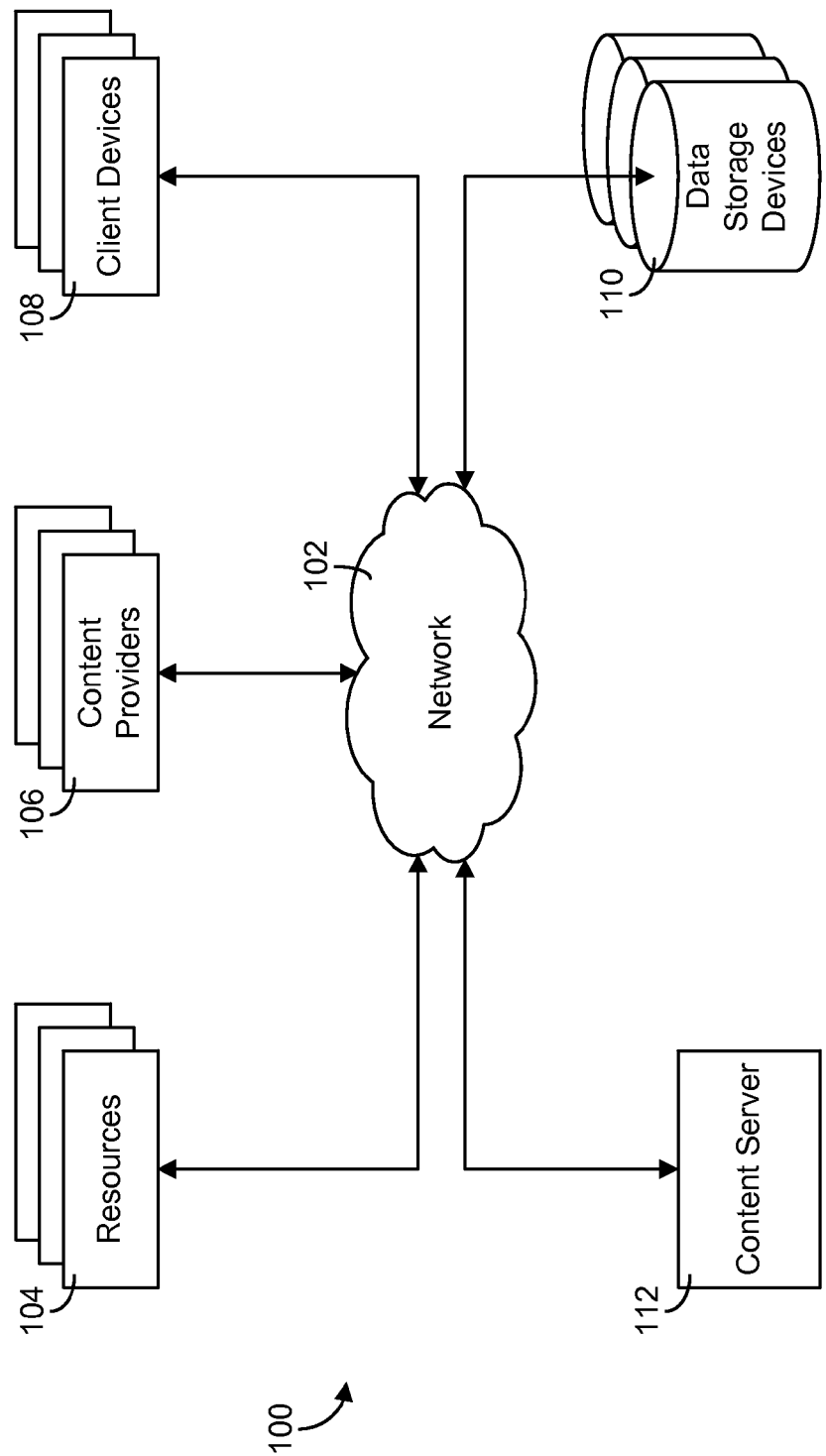
FIG. 1 is a block diagram of a computing system including a content server configured to provide interstitial content for presentation on a client device, according to a described implementation.

Referring now to FIG. 1, a block diagram of a computing system 100 is shown, according to a described implementation. In brief overview, computing system 100 is shown to include a network 102, resources 104, content providers 106, client devices 108, data storage devices 110, and a content server 112. It should be noted that although the various components of computing system 100 are shown and described separately with reference to FIG. 1, in some implementations, one or more components of computing system 100 may be combined into a single component. Data storage devices 110 may be a component of content server 112, resources 104, content providers 106, and/or client devices 108. In other implementations, the functions of resources 104 and content providers 106 may be performed by a single entity.

Computing system 100 may facilitate communication between resources 104, content providers 106, and client devices 108. Client devices 108 may request and receive first-party resource content (e.g., web pages, documents, etc.) from resources 104 via network 102. In some implementations, resources 104 include content slots for presenting third-party content items from content providers 106. When resource content is viewed by client devices 108, third-party content items from content providers 106 may be delivered and presented in the content slots of resources 104.

Computing system 100 may also facilitate communication between resources 104, content providers 106, client devices 108, and content server 112. Content server 112 may receive a notification of opportunity for presenting interstitial content from client devices 108 when resource content from resources 104 (e.g., a first webpage) is loaded and/or viewed by client devices 108. Content server 112 may select one or more third-party content items (e.g., advertisements provided by content providers 106) and deliver the selected content items to client devices 108. Content server 112 may generate an interstitial configuration object (e.g., computer-readable instructions) for presenting interstitial content on client devices 108 and deliver the interstitial configuration object to client devices 108. The interstitial configuration object may cause client devices 108 to request interstitial content from content server 112, to render the interstitial content as a hidden element concurrently with the first resource, and to reveal the rendered interstitial content in response to a user command to navigate away from the first resource (e.g., clicking a link from the first webpage to a second webpage).

Still referring to FIG. 1, and in greater detail, computing system 100 is shown to include a network 102. Network 102 may be a local area network (LAN), a wide area network (WAN), a cellular network, a satellite network, a radio network, the Internet, or any other type of data network or combination thereof. Network 102 may include any number of computing devices (e.g., computers, servers, routers, network switches, etc.) configured to transmit, receive, or relay data. Network 102 may further include any number of hardwired and/or wireless connections. Client devices 108 may communicate wirelessly (e.g., via WiFi, cellular, radio, etc.) with a transceiver that is hardwired (e.g., via a fiber optic cable, a CAT5 cable, etc.) to a computing device of network 102.

Still referring to FIG. 1, computing system 100 is shown to include resources 104. Resources 104 may include any type of information or data structure that can be provided over network 102. In some implementations, resources 104 may be identified by a resource address associated with each resource (e.g., a uniform resource locator (URL)). Resources 104 may include websites, webpages (e.g., HTML webpages, PHP webpages, etc.), word processing documents, portable document format (PDF) documents, images, video, programming elements, interactive content, streaming video/audio sources, or other types of electronic information.

Resources 104 may include first-party content provided by various publishers. In some implementations, a publisher may operate a website which includes a plurality of webpages (e.g., a first webpage, a second webpage, etc.). The website and the webpages may be part of resources 104. The publisher may interact with content server 112 to elect whether to display interstitial content in association with various webpages of resources 104. The publisher may adjust configuration settings for resources 104 to designate one or more webpages of resources 104 as a webpage which triggers the presentation of interstitial content when a user command to navigate away from the webpage is received. Publishers may interact with content server 112 (e.g., via a management interface) to adjust the configuration settings for various webpages of resources 104.

Resources 104 may include a variety of content elements. Content elements may include, textual content elements (e.g., text boxes, paragraph text, text snippets, etc.), image content elements (e.g., pictures, graphics, etc.), video content elements (e.g., streaming video, moving graphics, etc.), hyperlink content elements (e.g., links to webpages, links to other resources, etc.), or any other type of content element that is rendered when resources 104 are viewed and/or loaded by client devices 108.

Content elements can have various sizes, positions, orientations, or other attributes defining how content elements are displayed on resources 104 (e.g., a transparency attribute, an overlay attribute, a visibility attribute, etc.). Some content elements may be rendered in an invisible frame. Attributes of content elements can be adjusted by client devices 108 and/or content server 112. In some implementations, a content element rendered in an invisible frame may become visible in response to a user command to navigate away from the current resource.

In some implementations, resources 104 include content slots for presenting third-party content items. Resources 104 may include one or more inline frame elements (e.g., HTML "iframe" elements, <iframe> . . . </iframe>) for presenting third-party content items from content providers 106. An inline frame can be a target frame for links defined by other elements and can be selected by user agents (e.g., client devices 108, a web browser running on client devices 108, etc.) as the focus for printing, viewing its source, or other forms of user interaction. The content slots may cause client devices 108 to request third-party content items in response to viewing first-party resource content from resources 104.

Various elements of resources 104 may be included in the original content of resources 104 or added to resources 104. Some elements of resources 104 may be part of the source code of resources 104. Other elements of resources 104 may be added by content providers 106, content server 112, and/or client devices 108. In some implementations, resources 104 may include a tag (e.g., a "show_ads" tag) which causes client devices 108 to request additional content from content server 112 when resources 104 are rendered or viewed by client devices 108. Additional content may include third-party content items, computer-readable instructions, configuration information, tag firing rules, or other content which can be inserted into resources 104. In various implementations, the additional content may be inserted into an existing frame of resources 104 or a new element may be created for the additional content. Client devices 108 may create and/or insert a new <ins> element in the document object model (DOM) of resources 104. The new element may be used to render interstitial content.

Resources 104 may include elements (e.g., tags, script elements, etc.) which have embedded information (e.g., meta-information embedded in hyperlinks) and/or embedded instructions. Embedded instructions may include computer-readable instructions (e.g., software code, JavaScript®, ECMAScript®, etc.) which are executed by client devices 108 (e.g., by a web browser running on client devices 108). Computer-readable instructions may be included in the original (i.e., source) content of resources 104 or added to resources 104 when rendered by client devices 108. Content server 112 may generate and deliver an interstitial configuration object (e.g., a code snippet) to client devices 108 along with a third-party content item. Client devices 108 may insert the interstitial configuration object into the content of resources 104.

Still referring to FIG. 1, computing system 100 is shown to include content providers 106. Content providers 106 may include one or more electronic devices representing advertisers, business owners, advertising agencies, or other entities capable of generating third-party content to be presented along with first-party content from resources 104. In some implementations, content providers 106 produce third-party content items (e.g., an ad creative) for presentation to client devices 108. In other implementations, content providers 106 may submit a request to have third-party content items automatically generated. The third-party content items may be stored in one or more data storage devices local to content providers 106, within content server 112, or in data storage devices 110.

In some implementations, the third-party content items are advertisements. The advertisements may be display advertisements such as image advertisements, animated advertisements, moving picture advertisements, audio advertisements, video advertisements, text-based advertisements, or any combination thereof. In other implementations, the third-party content items may include other types of content which serve various non-advertising purposes.

In some implementations, third-party content items include interstitial content. Interstitial content may include advertisements which are displayed temporally between two resources. That is, when a user clicks a link from a first resource to a second resource, an interstitial advertisement may be shown to the user before the second resource is displayed. Interstitial content can also be used to introduce another page or site, to inform a user that the next page requires a login or is part of a different domain, or for a variety of other informational and/or promotional uses. Interstitial advertisements can be very effective due to the full share-of-voice provided to content providers 106.

The third-party content items may be configured for presentation in a variety of different formats (e.g., as banner advertisements, as interstitial advertisements, as video advertisements, as audio advertisements, as non-interstitial advertisements, etc.). In some implementations, third-party content items include content configured for concurrent presentation with first-party content from resources 104. In these implementations, third-party content items can include content which is configured for presentation in a content slot of resources 104 alongside content from resources 104.

In some implementations, content providers 106 submit campaign parameters to content server 112. The campaign parameters may be used to control the distribution of third-party content items to client devices 108. The campaign parameters may include keywords associated with the third-party content items, bids corresponding to the keywords, a content distribution budget, geographic limiters, or other criteria used by content server 112 to determine when a third-party content item may be presented to client devices 108. Content providers 106 may identify particular content items as interstitial content, non-interstitial content, or any combination thereof.

Content providers 106 may access content server 112 to monitor the performance of the third-party content items distributed according to the established campaign parameters. In some implementations, content providers 106 may access content server 112 to review one or more behavior metrics associated with a third-party content item or set of third-party content items. The behavior metrics may describe the interactions between client devices 108 with respect to a distributed third-party content item or set of third-party content items (e.g., number of impressions, number of clicks, number of conversions, an amount spent, etc.). The behavior metrics may be based on user actions logged and processed by an accounting system or a log file processing system.

Still referring to FIG. 1, computing system 100 is shown to include client devices 108. Client devices 108 may include any number and/or type of user-operable electronic devices. Client devices 108 may include desktop computers, laptop computers, smartphones, tablets, mobile communication devices, remote workstations, client terminals, entertainment consoles, or any other devices capable of interacting with the other components of computing system 100 (e.g., via a communications interface). Client devices 108 may be capable of receiving resource content from resources 104 and/or third-party content items from content providers 106 or content server 112. Client devices 108 may include mobile devices or non-mobile devices.

In some implementations, client devices 108 include an application (e.g., a web browser, a resource renderer, etc.) for converting electronic content into a user-comprehensible format (e.g., visual, aural, graphical, etc.). Client devices 108 may include a user interface element (e.g., an electronic display, a speaker, a keyboard, a mouse, a microphone, a printer, etc.) for presenting content to a user, receiving user input, or facilitating user interaction with electronic content (e.g., clicking on a content item, hovering over a content item, etc.). Client devices 108 may function as a user agent for allowing a user to view HTML encoded content.

Client devices 108 may include a processor capable of processing embedded information (e.g., meta information embedded in hyperlinks, etc.) and executing embedded instructions. Embedded instructions may include computer-readable instructions (e.g., software code, JavaScript®, ECMAScript®, etc.) associated with a content slot within which a third-party content item is presented. Client devices 108 load one or more embedded tags (e.g., a "show_ads" tag) in conjunction with resource content from resources 104. An embedded tag may include computer-readable instructions which cause client devices 108 to request a third-party content item from content server 112 when the instructions are executed by client devices 108.

Client devices 108 may be configured to receive and execute an interstitial configuration object. In various implementations, client devices 108 may receive the interstitial configuration object from resources 104 (e.g., as part of the original resource content) or from content server 112. Content server 112 may deliver the interstitial configuration object to client devices 108 along with a third-party content item. The interstitial configuration object may include computer-readable instructions (e.g., a code snippet) for presenting interstitial content on client devices 108.

Client devices 108 may run (e.g., process, execute, perform instructions provided by, etc.) the interstitial configuration object to perform various operations in accordance with the instructions included therein. The interstitial configuration object may cause client devices 108 to request interstitial content from content server 112, to render the interstitial content as a hidden element concurrently with a first resource, to reveal the rendered interstitial content in response to a user command to navigate away from the first resource, and/or to perform other operations associated with the presentation of interstitial content on client devices 108 (described in greater detail with reference to FIG. 3).

In some implementations, client devices 108 are capable of detecting an interaction with a distributed content item. An interaction with a content item may include displaying the content item, hovering over the content item, clicking on the content item, viewing source information for the content item, or any other type of interaction between client devices 108 and a content item. Interaction with a content item does not require explicit action by a user with respect to a particular content item. In some implementations, an impression (e.g., displaying or presenting the content item) may qualify as an interaction. The criteria for defining which user actions (e.g., active or passive) qualify as an interaction may be determined on an individual basis (e.g., for each content item), by content providers 106, or by content server 112.

Client devices 108 may generate a variety of user actions. In some implementations, client devices 108 may generate a user action in response to a detected interaction with a content item. The user action may include a plurality of attributes including a content identifier (e.g., a content ID or signature element), a device identifier, a referring URL identifier, a timestamp, or any other attributes describing the interaction. Client devices 108 may generate user actions when particular actions are performed (e.g., resource views, online purchases, search queries submitted, etc.). The user actions generated by client devices 108 may be communicated to content server 112 or a separate accounting system.

For situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated (e.g., by content server 112) in one or more ways before it is stored or used, so that personally identifiable information is removed. A user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected (e.g., by an application, by client devices 108, etc.) and used by content server 112.

Still referring to FIG. 1, computing system 100 is shown to include data storage devices 110. Data storage devices 110 may be any type of memory device capable of storing profile data, content item data, accounting data, or any other type of data used by content server 112 or another component of computing system 100. Data storage devices 110 may include any type of non-volatile memory, media, or memory devices. Data storage devices 110 may include semiconductor memory devices (e.g., EPROM, EEPROM, flash memory devices, etc.) magnetic disks (e.g., internal hard disks, removable disks, etc.), magneto-optical disks, and/or CD ROM and DVD-ROM disks.

In some implementations, data storage devices 110 are local to content server 112, resources 104, client devices 108, or content providers 106. In other implementations, data storage devices 110 are remote data storage devices connected with content server 112 and/or other components of computing system 100 via network 102. In some implementations, data storage devices 110 are part of a data storage server or system capable of receiving and responding to queries from content server 112 and/or client devices 108.

In some implementations, data storage devices 110 are configured to store configuration settings for resources 104. Data storage devices 110 may include an interstitial configuration database configured to store interstitial configuration data for a plurality of webpages or other types of resources 104. Interstitial configuration data for a resource may include an indication of whether a publisher of the resource has elected and/or designated the resource to trigger the presentation of interstitial content when a user command to navigate away from the resource is detected. In another implementation, interstitial configuration data for a resource may include a selection (e.g., a subset, a listing, etc.) of links on the resource which trigger the display of interstitial content when selected (e.g., clicked) by a user of client devices 108.

Interstitial configuration data may be stored in data storage devices 110 by content server 112. Publishers of resources 104 may interact with content server 112 to adjust the configuration data for various resources. When a notification of an opportunity for presenting interstitial content is received at content server 112, content server 112 may identify a resource associated with the notification. The resource associated with the notification may be a resource currently being viewed by client devices 108 (i.e., a first webpage). Content server 112 may retrieve the interstitial configuration data from data storage devices 110 and use the interstitial configuration data to generate the interstitial configuration object.

Still referring to FIG. 1, computing system 100 is shown to include a content server 112. In some implementations, content server 112 is a third-party content server. Content server 112 may receive a notification of an available impression from resources 104 and/or client devices 108. The notification of an available impression may be received in response to first-party content from resources 104 being viewed and/or loaded by client devices 108. In some implementations, when client devices load resource content from resources 104, client devices 108 may also load one or more embedded tags (e.g., code snippets) that cause client devices 108 to send a notification of an available impression to content server 112. The notification of an available impression may include a request for third-party content. Content server 112 may be configured to identify a particular resource with which the third-party content item will be displayed (e.g., by URL, by domain name, etc.). Content server 112 may select a third-party content item and deliver the selected third-party content item to client devices 108.

In some implementations, content server 112 receives a notification of an opportunity for presenting interstitial content on a client device. The notification of an opportunity for presenting interstitial content may be received from client devices 108 in conjunction with the notification of an available impression and/or the request for third-party content. In some implementations, the notification of an opportunity for presenting interstitial content may not specifically request an interstitial content item. Rather, the notification of an opportunity for presenting interstitial content may announce to content server 112 that interstitial content is capable of being displayed on a client device in association with the identified resource.

Content server 112 may perform a server-side frequency check to determine whether interstitial content can be presented on a particular client device. The server-side frequency check may prevent interstitial content from being presented to a client device with a frequency in excess of a frequency threshold (e.g., a limited number of presentations of interstitial content per unit time). Content server 112 may determine a previous time at which interstitial content was most recently presented on the client device associated with the notification of the opportunity for presenting interstitial content. Content server 112 may determine a difference between the time at which interstitial content was most recently presented on the client device and a current time. Content server 112 may compare the difference with a frequency threshold. If the difference exceeds the frequency threshold, content server 112 may determine that interstitial content can be presented on the client device. If the difference does not exceed the frequency threshold, content server 112 may determine that interstitial content cannot be presented on the client device. In other implementations, content server 112 may restrict the presentation of interstitial content in excess of a frequency threshold (e.g., two interstitial content items per content provider per week, five interstitial content items per week, etc.).

Content server 112 may retrieve interstitial configuration data for the identified resource (e.g., a first webpage) from data storage devices 110. The interstitial configuration data may include configuration settings for the identified resource indicating whether and under what circumstances interstitial content can be presented on client devices 108 in association with the identified resource. The interstitial configuration data may include an indication of whether a publisher of the identified resource has elected to display interstitial content when client device submits a command to navigate away from the identified resource and/or a listing of links which trigger the display of interstitial content when selected (e.g., clicked by a user).

Content server 112 may use the interstitial configuration data to generate an interstitial configuration object. The interstitial configuration object may include computer-readable instructions for presenting interstitial content on client devices 108. Content server 112 may deliver the interstitial configuration object to client devices 108 along with a selected third-party content item. The interstitial configuration object may be executed by client devices 108. The interstitial configuration object may cause client devices 108 to request interstitial content, to render the interstitial content as a hidden element concurrently with a first resource (e.g., a first webpage), and to reveal the rendered interstitial content in response to a user command to navigate away from the first resource. Content server 112 is described in greater detail with reference to FIG. 3.

Figure 2:
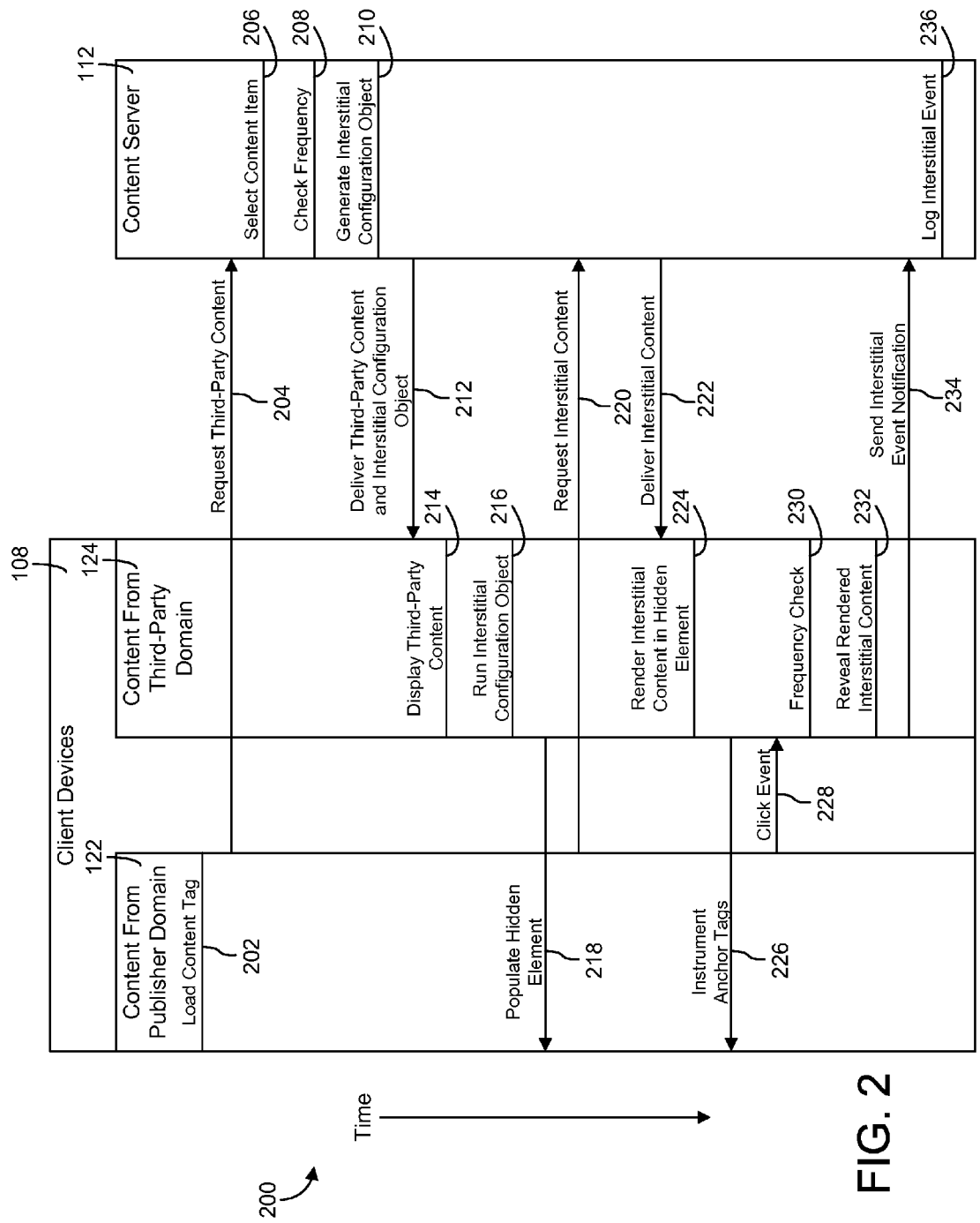
FIG. 2 is a flow diagram of a method for providing interstitial content illustrating the interactions between the client device and the content server of FIG. 1, according to a described implementation.

Referring now to FIG. 2, a flow diagram 200 illustrating a process for providing interstitial content is shown, according to a described implementation. Flow diagram 200 illustrates various interactions between client devices 108 and content server 112. The interactions may be direct (e.g., directly from client devices 108 to content server 112, directly from content server 112 to client devices 108, etc.) or indirect (e.g., via network 102 or one or more intermediaries). Flow diagram 200 is also a timing diagram illustrating an order of the depicted interactions, according to a described implementation. In flow diagram 200, time progresses from top to bottom such that relatively earlier events are shown toward the top of flow diagram 200 and relatively later events are shown toward the bottom of flow diagram 200.

In flow diagram 200, client devices 108 are shown to include content from a publisher domain 122 and content from a third-party domain 124. Content from a publisher domain 122 may include first-party content from resources 104 which has been loaded and/or rendered by client devices 108. Content from a third-party domain 124 may include third-party content (e.g., advertisements, interstitial content, computer-readable code, tag firing rules, etc.) received from content server 112.

Flow diagram 200 is shown to include client devices 108 loading a content tag (stage 202). The content tag may be loaded by client devices 108 when client devices 108 load first-party content from a first resource (e.g., a first webpage). The content tag may be a code snippet of the first resource (e.g., inserted by a publisher of the first resource) which triggers a communication from client devices 108 to content server 112. The content tag may be a "show_ads" tag which causes client devices 108 to request a third-party content item from content server 112. In some implementations, the content tag may include an indication of whether a publisher of the first resource has elected to display interstitial content in association with the first resource. In some implementations, the content tag may be configured to request a non-interstitial content item from content server 112.

Still referring to FIG. 2, flow diagram 200 is shown to include client devices 108 requesting third-party content from content server 112 (stage 204). Stage 204 may be performed in response to client devices loading the content tag in stage 202. The request for third-party content may include a notification of an available impression and/or a notification of an opportunity for presenting interstitial content. In some implementations, the request for third-party content in stage 204 does not specifically request interstitial content. Rather, the request in stage 204 may opportunistically announce that an opportunity for presenting interstitial content exists.

Content server 112 may respond to the request for third-party content by selecting a third-party content item (stage 206), performing a server-side frequency check (stage 208), and/or generating an interstitial configuration object (stage 210). The third-party content item selected in stage 206 may be a non-interstitial content item and may be displayed alongside first-party content. In some implementations, some or all of stages 206-210 may be performed concurrently. In some implementations, content server 112 generates the interstitial configuration object in response to a determination (e.g., in stage 208) that a difference between a current time and a time since interstitial content was last presented on the client device exceeds a time threshold and/or in response to a determination that another presentation of interstitial content would not cause an interstitial presentation frequency to exceed a frequency limit. The interstitial configuration object may include computer-readable instructions for requesting, rendering, and/or presenting interstitial content.

Still referring to FIG. 2, flow diagram 200 is shown to include content server 112 delivering the third-party content item and the interstitial configuration object to client devices 108 (stage 212). Stage 212 may include embedding the interstitial configuration object (e.g., a snippet of computer-readable code) in the third-party content item. Client devices 108 may display the third-party content item within a content slot on third-party content domain 124 (stage 214). In some implementations, the interstitial configuration object is inserted (e.g., along with the third-party content item) into a content frame in third-party content domain 124.

Still referring to FIG. 2, flow diagram 200 is shown to include client devices running the interstitial configuration object (stage 216). Client devices 108 may run the interstitial configuration object inside a content frame in third-party content domain 124. In some implementations, the interstitial configuration object may provide publisher-specific configuration information for displaying interstitial content. The interstitial configuration object may provide information regarding how to find links and/or anchor tags on publisher domain 122 which can be modified to trigger the presentation of interstitial content when selected.

The interstitial configuration object may cause client devices 108 to populate a new element in publisher domain 122 (stage 218). The new element may be an <ins> element in the document object model (DOM) of the resource currently being viewed by client devices 108 (e.g., appended to the bottom of the DOM). The new element is initially created as an invisible or hidden element. In some implementations, stage 218 is performed in response to client devices 108 running the interstitial configuration object in stage 216. The interstitial configuration object may include instructions for creating the new hidden element on publisher domain 122.

The interstitial configuration object may cause client devices 108 to request interstitial content from content server 112 (stage 220). Content server 112 may select and deliver the interstitial content to client devices 108 in response to the request (stage 222). Client devices 108 may render the interstitial content in the hidden element created in stage 218 (stage 224). The interstitial content may be fully rendered concurrently with the content of the first resource. The interstitial content may remain hidden until a user command to navigate away from the first resource is received.

Still referring to FIG. 2, flow diagram 200 is shown to include instrumenting anchor tags on publisher domain 122 (stage 226). Stage 226 may include altering or modifying one or more elements of publisher domain 122 (e.g., links, tags, etc.) so that clicking on any of the instrumented elements will trigger the interstitial content to be displayed.

In some implementations, stage 226 is performed in response to running the interstitial configuration object. The interstitial configuration object may include instructions for instrumenting various elements on publisher domain 122.

In some implementations, stage 226 includes identifying elements on publisher domain 122 will cause a navigation to another resource on the same domain as the first resource. Stage 226 may include identifying links and/or anchor tags which have a non-empty href attribute referencing another resource on the same domain. In some implementations, stage 226 includes identifying elements on publisher domain 122 which have no explicit on-click handler. Stage 226 may include instrumenting elements on publisher domain 122 which cause a navigation to another resource on the same domain and/or which have no explicit on-click handler.

In some implementations, stage 226 includes identifying and/or recording a pre-instrumentation href attribute of each instrumented anchor tag. The href attribute may identify a resource (i.e., a second resource, a second webpage, etc.) to which the instrumented anchor tag would have directed client devices 108 prior to the instrumentation. The identified href attribute may be used to direct client devices 108 to the second resource after the interstitial content is presented.

Stage 226 may include attaching a click event handler to each instrumented element. The click event handler may be configured to detect a user interaction with an element to which the click event handler is attached. In some implementations, the click event handler may detect a user clicking on one of the instrumented links. The click event handler may be configured to cancel any navigation away from the first resource which would normally be caused by selecting an instrumented element. The click event handler may also be configured to reveal the interstitial content when the instrumented element is selected.

Still referring to FIG. 2, flow diagram 200 is shown to include detecting a click event (stage 228) and revealing the rendered interstitial content (stage 232). A click event may occur in response to a user command to navigate away from the first resource. A click event may occur when a user clicks or otherwise selects a link or other element of the first resource (e.g., an instrumented element). The click event may be detected by the click event handler attached to the element. Client devices 108 may reveal the rendered interstitial content in response to the click event. Because the interstitial content has been fully rendered in stage 224, revealing the rendered interstitial content may occur with little or no latency overhead.

In some implementations, revealing the rendered interstitial content includes modifying the invisible frame in which the interstitial content is rendered. The invisible frame may be modified to become visible in response to the click event. In some implementations, the interstitial content is presented in an iframe overlay on the first resource. The overlay in which the interstitial content is presented may be opaque in order to mimic the appearance of a separate resource and/or webpage. However, the frame in which the interstitial content is presented may be an element of the first resource which is modified to become visible in response to the click event.

In some implementations, revealing the interstitial content is triggered only by navigating between two resources from the same publisher. A transition from a first resource (e.g., a first webpage) to a second resource (e.g., a second webpage) may trigger presentation of the interstitial content only the first resource and the second resource are provided by the same publisher (e.g., part of the same website, part of the same domain, etc.). A transition between two resources provided by the same publisher can be detected by matching the full hostname of the href attribute of the clicked element (i.e., the hostname of the second resource) to the hostname of resource currently being viewed (i.e., the hostname of the first resource).

In some implementations, client devices 108 perform a client-side frequency check (stage 230). The client-side frequency check performed by a client device may include determining whether interstitial content has been displayed on the client device within a specified time window (e.g., within the last hour). In stage 230, client devices 108 may enforce a global frequency cap (e.g., maximum interstitials per user per time unit) using local storage (e.g., a timestamp indicating last view time) on third-party content domain 124. In some implementations, if the client device has not presented previous interstitial content within the specified time window, the interstitial content pre-rendered in stage 224 may be presented. If the client device has presented previous interstitial content within the specified time window, the interstitial content pre-rendered in stage 224 may be abandoned without presentation.

In some implementations, the client-side frequency check may be performed by a client device in response to a click event (e.g., when an instrumented link is clicked). Performing the client-side frequency check in response to a click event (i.e., stage 228) rather than at the time the interstitial content is requested (i.e., stage 220) may allow client devices 108 to check whether other interstitial content has been presented (e.g., in another tab) between stage 220 and stage 228. In other implementations, the client-side frequency check may be performed at any time during the process illustrated in flow diagram 200.

Still referring to FIG. 2, flow diagram 200 is shown to include sending an interstitial event notification from client devices 108 to content server 112 (stage 234). The interstitial event notification may be sent from client devices 108 to content server 112 in response to revealing the rendered interstitial content in stage 232. The interstitial event notification may notify content server 112 that the interstitial content was presented on client devices 108 (e.g., made visible on screen).

Content server 112 may use the interstitial event notification to determine that an interstitial impression event has occurred. Until the interstitial event notification is received at content server 112, content server 112 may be unaware whether the interstitial content was actually presented on client devices 108. For example, the interstitial content may be discarded without presentation if a user of client devices 108 closes the browser window, clicks the back button, or clicks on a link that does not trigger the interstitial content to be revealed (e.g., clicking on a link to a webpage from a different publisher). The interstitial event notification informs content server 112 that the interstitial content was presented on client devices 108.

Still referring to FIG. 2, flow diagram 200 is shown to include logging the interstitial event (stage 236). Content server 112 may log the interstitial event (e.g., in data storage devices 110) in response to receiving an interstitial event notification from client devices 108. A logged interstitial event may include a content item attribute (e.g., identifying a particular content item presented as interstitial content), a device identifier or user identifier attribute (e.g., identifying a particular client device or user profile associated with the interstitial event), a content provider attribute (e.g., identifying a particular third-party content provider associated with the interstitial content), a time attribute, and/or other attributes associated with the impression event.

Content server 112 may use logged interstitial events to bill content providers 106 for presentations of interstitial content. Content server 112 may also use logged interstitial events as a source of data when performing the server-side frequency cap check in stage 208. For example, content server 112 may check interstitial event logs to determine whether an interstitial content item can be presented on a client device without exceeding a maximum presentation frequency threshold (e.g., a predetermined number of interstitial content items per unit time).

After the interstitial content is presented, client devices 108 may automatically navigate to a second resource. The second resource may be associated with the element of the first resource which triggered presentation of the interstitial content. A URL of the second resource may be defined by the href attribute of the anchor tag that was clicked by a user to trigger the interstitial content. In some implementations client devices 108 initiate pre-rendering of the second resource as soon as the interstitial content is displayed. By pre-rendering the second resource, the transition time from the interstitial content to the second resource may be minimized.

Figure 3:
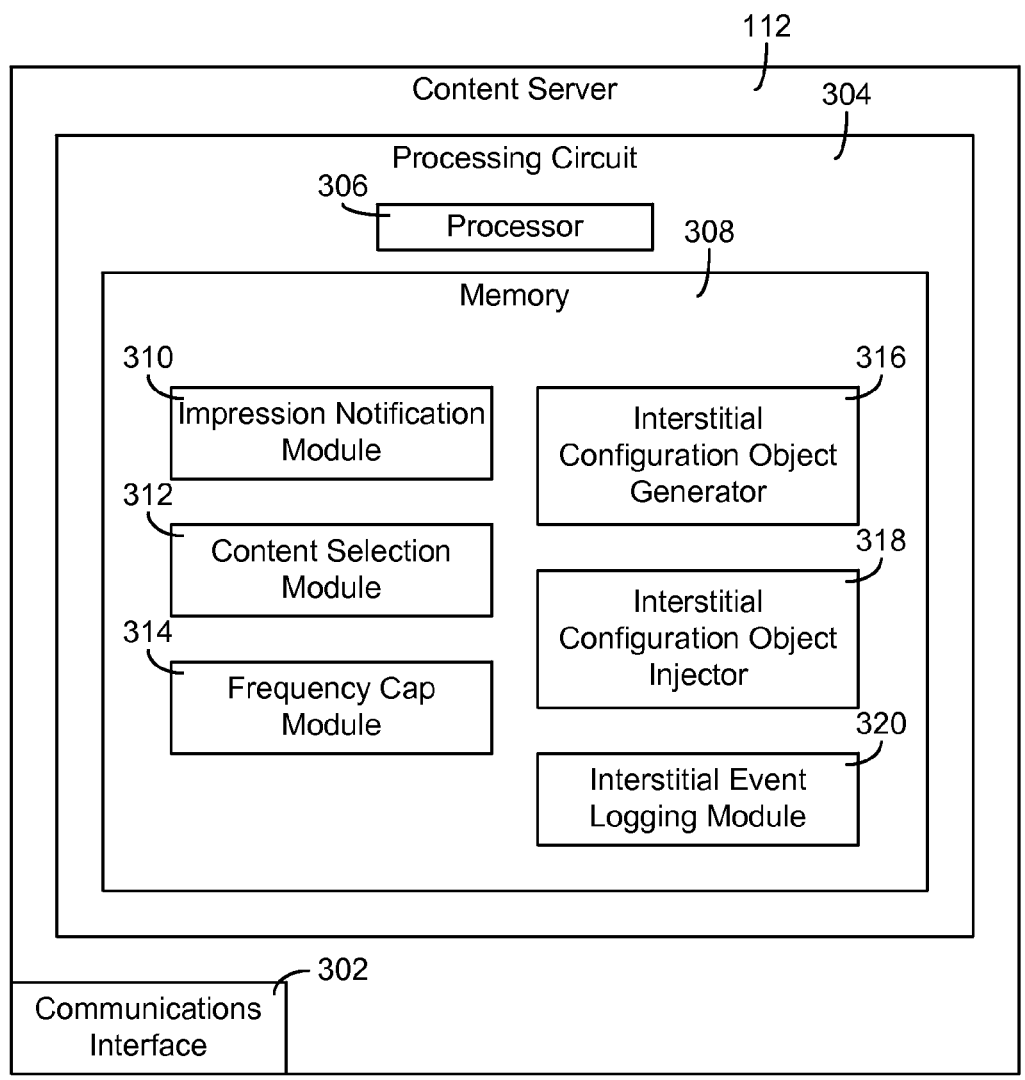
FIG. 3 is a block diagram illustrating the content server of FIGS. 1 and 2 in greater detail, according to a described implementation.

Referring now to FIG. 3, a block diagram illustrating content server 112 in greater detail is shown, according to a described implementation. Content server 112 is shown to include a communications interface 302 and a processing circuit 304. Communications interface 302 may include wired or wireless interfaces (e.g., jacks, antennas, transmitters, receivers, transceivers, wire terminals, Ethernet ports, WiFi transceivers, etc.) for conducting data communications with local or remote devices or systems. Communications interface 302 may allow content server 112 to communicate with resources 104, content providers 106, client devices 108, network 102, and/or data storage devices 110.

Processing circuit 304 is shown to include a processor 306 and memory 308. Processor 306 may be implemented as a general purpose processor, an application specific integrated circuit (ASIC), one or more field programmable gate arrays (FPGAs), a CPU, a GPU, a group of processing components, or other suitable electronic processing components.

Memory 308 may include one or more devices (e.g., RAM, ROM, flash memory, hard disk storage, etc.) for storing data and/or computer code for completing and/or facilitating the various processes, layers, and modules described in the present disclosure. Memory 308 may include volatile memory or non-volatile memory. Memory 308 may include database components, object code components, script components, or any other type of information structure for supporting the various activities and information structures described in the present disclosure. In some implementations, memory 308 is communicably connected to processor 306 via processing circuit 304 and includes computer code (e.g., data modules stored in memory 308) for executing one or more processes described herein. Memory 308 is shown to include an impression notification module 310, a content selection module 312, a frequency cap module 314, an interstitial configuration object generator 316, an interstitial configuration object injector 318, and an interstitial event logging module 320.

Still referring to FIG. 3, memory 308 is shown to include an impression notification module 310. Impression notification module 310 may be configured to receive a notification of an available impression from a first-party resource (e.g., resources 104) and/or from client devices 108. First-party resources may include one or more content slots for presenting third-party content items. The content slots may cause first-party resources to request a third-party content item when loaded by client devices 108.

In some implementations, impression notification module 310 receives a notification of an available impression from client devices 108. In these implementations, when client devices 108 load a first-party resource, an embedded content slot in the first-party resource (e.g., an embedded tag, a "show_ads" tag, etc.) may cause client devices 108 to request a third-party content item from content server 112. Client devices 108 may notify impression notification module 310 of an available impression by requesting a third-party content item from content server 112. The notification of the available impression may include an indication of the first-party resource with which the third-party content item will be presented. The notification of the available impression may include a webpage URL, a document URL, a domain name, or other indication of a particular first-party resource.

In some implementations, impression notification module 310 receives a notification of an opportunity for presenting interstitial content on a client device. The notification of an opportunity for presenting interstitial content may be received from client devices 108 in conjunction with the notification of an available impression and/or the request for third-party content. In some implementations, the notification of an opportunity for presenting interstitial content may not specifically request an interstitial content item. Rather, the notification of an opportunity for presenting interstitial content may announce to content server 112 that interstitial content is capable of being displayed on a client device in association with the identified first-party resource.

In some implementations, impression notification module 310 uses the identity of the first-party resource to determine whether an opportunity exists for presenting interstitial content on a client device. Impression notification module 310 may retrieve configuration settings for the identified resource from a configuration settings database (e.g., from data storage devices 110). The configuration settings may be set by a publisher of the identified resource (e.g., via a management interface) and may indicate whether the publisher has elected to display interstitial content in association with the identified resource.

Still referring to FIG. 3, memory 308 is shown to include a content selection module 312. Content selection module 312 may be configured to select a third-party content item in response to the request for content received from client devices 108. In some implementations, content selection module 312 identifies a particular resource with which the third-party content item will be displayed (e.g., by URL, by domain name, etc.). Content selection module 312 may select a third-party content item for presentation in association with the identified resource. The third-party content item may be a non-interstitial content item (e.g., a content item presented in a slot of a webpage, alongside resource content) or an interstitial content item.

In some implementations, content selection module 312 selects a third-party content item that is relevant to the first-party resource content in conjunction with which the third-party content item will be presented (e.g., based on the content of the first resource). Content selection module 312 may select a third-party content item by comparing the keywords associated with the content item (e.g., specified by content providers 106, additional keywords extracted from the content item, etc.) with the keywords associated with the first resource. A topic or type of content included in resources 104 may be used to establish keywords for resources 104.

In some implementations, content selection module 312 selects a third-party content item by considering whether the content item is relevant to the client device 108 to which the content item will be presented. Content selection module 312 may compare the keywords associated with the content item with information (e.g., profile data, user preferences, etc.) associated with a particular client device 108 requesting the content item.

In some implementations, content selection module 312 exposes the available impression to content providers 106. Content selection module 312 may auction the available impression to content providers 106. In some implementations, content selection module 312 selects an eligible third-party content item based on a result of the auction. Content selection module 312 may select an eligible content item associated with the content provider that submits the highest bid.

Content selection module 312 may generate a quality signal for the available impression. The quality signal may be based on one or more indications of an estimated return on investment associated with the impression (e.g., an established click-through-rate, a predicted click-through-rate, etc.). The quality signal may be a general quality signal for the identified resource, a particular quality signal for the available impression, or an individualized quality signal for the available impression and a particular third-party content item. Content selection module 312 may provide the quality signal to content providers 106 to consider when bidding on the available impression.

In some implementations, content selection module 312 selects a third-party content item which has characteristics matching the characteristics of a content slot in which the content item will be presented. Content selection module 312 may select a content item having a display size which fits in a destination content slot. Content selection module 312 may resize a selected content item to fit a content slot or add additional visual content to the selected content item (e.g., padding, a border, etc.) based on the display size of the content item and the display size of the content slot. In some implementations, eligible content items include content items matching established user preferences for receiving individualized content; however, content selection module 312 may select a content item that does not match established user preferences if an insufficient number of preferred content items are available.

Content selection module 312 may deliver the selected third-party content item to client devices 108 for presentation in association with the first resource. If the third-party content item is a non-interstitial content item, the third-party content item may be displayed alongside first-party content from the first resource. If the third-party content item is an interstitial content item, the third-party content item may be rendered in an invisible frame of the first resource and subsequently and revealed in response to a user command to navigate away from the first resource.

Still referring to FIG. 3, memory 308 is shown to include a frequency cap module 314. Frequency cap module 314 may be configured to restrict the presentation of interstitial content in excess of a frequency limit. In some implementations, frequency cap module 314 receives the notification of an opportunity for presenting interstitial content on a client device. Frequency cap module 314 may be configured to identify a client device associated with the opportunity for presenting interstitial content (e.g., the client device on which the interstitial content would be presented). Frequency cap module 314 may retrieve interstitial presentation data associated with the identified client device (e.g., from data storage devices 110). In various implementations, the presentation data may include one or more time values indicating times at which previous interstitial content was presented on the client device and/or frequency values indicating a frequency with which previous interstitial content was presented on the client device.

Frequency cap module 314 may be configured to compare the stored interstitial presentation data with an interstitial presentation threshold. The interstitial presentation threshold may specify a maximum permissible frequency with which interstitial content can be presented to a client device and/or a minimum permissible time between presentations of interstitial content to the client device. The interstitial presentation threshold may apply to interstitial content associated one or more of content providers 106 (e.g., one interstitial content item per hour per content provider, two interstitial content items per week from a specific content provider, etc.).

Frequency cap module 314 may determine whether another item of interstitial content can be presented on the client device in association with first resource (i.e., the resource currently being viewed by the client device) without exceeding the interstitial presentation threshold. If another item of interstitial content can be presented in association with the first resource without exceeding the interstitial presentation threshold, frequency cap module 314 may trigger interstitial configuration object generator 316 to generate an interstitial configuration object for delivery to the client device. If another item of interstitial content cannot be presented in association with the first resource without exceeding the interstitial presentation threshold, frequency cap module 314 may determine that an interstitial configuration object should not be generated and/or delivered to the client device.

Still referring to FIG. 3, memory 308 is shown to include an interstitial configuration object generator 316. Interstitial configuration object generator 316 may be configured to generate an interstitial configuration object for delivery to the client device. In some implementations, interstitial configuration object generator 316 generates the interstitial configuration object in response to a determination (e.g., by frequency cap module 314) that another item of interstitial content can be presented to the client device in association with the first resource without exceeding the interstitial presentation threshold.

The interstitial configuration object may include computer-readable instructions which configure the client device to perform one or more operations associated with requesting, rendering, and/or presenting interstitial content on the client device. Interstitial configuration object generator 316 may generate an interstitial configuration object which causes the client device to create a new content element (e.g., an <ins> element, a hidden frame, etc.) and to insert the new element into the content of the first resource (e.g., into the document object model of the first resource).

The interstitial configuration object may cause the client device to request interstitial content from content server 112 and to render the interstitial content. The interstitial configuration object may cause the client device to render the interstitial content in an invisible and/or hidden element of the first resource. The interstitial content may be rendered in an invisible frame of the first resource while the first resource is being viewed by the client device.

The interstitial configuration object may cause the client device to instrument one or more elements of the first resource. In some implementations, the interstitial configuration object contains instructions for identifying elements of the first resource to instrument. The interstitial configuration object may include instructions for identifying elements of the first resource which cause client devices to navigate to another resource on the same domain as the first resource (e.g., links and/or anchor tags which have a non-empty href attribute referencing another resource on the same domain). In some implementations, the interstitial configuration object includes instructions for identifying elements of the first resource which have no explicit on-click handler. The interstitial configuration object may cause the client device to instrument elements of the first resource which cause a navigation to another resource on the same domain and/or which have no explicit on-click handler.

Instrumenting an element of the first resource may include appending content to the element, modifying the element, or otherwise changing the element. In some implementations, instrumenting an element of the first resource includes attaching a click event handler to each instrumented element. The click event handler may be configured to detect a user interaction with an element to which the click event handler is attached. The click event handler may detect a user clicking on one of the instrumented elements. The click event handler may be configured to cancel any navigation away from the first resource which would normally be caused by selecting an instrumented element. The click event handler may also be configured to reveal the interstitial content when the instrumented element is selected.

The interstitial configuration object may cause the client device to reveal the rendered interstitial content in response to a user command to navigate away from the first resource. The interstitial content may be revealed in response to a user clicking on an instrumented link of the first resource. In some implementations, revealing the rendered interstitial content includes modifying the invisible frame in which the interstitial content is rendered. The invisible frame may be modified to become visible in response to the click event. In some implementations, the interstitial content is presented in an iframe overlay on the first resource. The overlay in which the interstitial content is presented may be opaque in order to mimic the appearance of a separate resource and/or webpage. However, the frame in which the interstitial content is presented may be an element of the first resource which is modified to become visible in response to the click event.

In some implementations, the interstitial configuration object causes the client device to reveal the rendered interstitial content only when the user command to navigate away from the first resource is a command to navigate to another resource associated with the same publisher as the first resource. A transition from a first resource (e.g., a first webpage) to a second resource (e.g., a second webpage) may trigger presentation of the interstitial content only the first resource and the second resource are provided by the same publisher (e.g., part of the same website, part of the same domain, etc.). A transition between two resources provided by the same publisher can be detected by matching the full hostname of the href attribute of the clicked element (i.e., the hostname of the second resource) to the hostname of resource currently being viewed (i.e., the hostname of the first resource).

The interstitial configuration object may cause the client device to perform a client-side frequency check. The client-side frequency check performed by a client device may include determining whether interstitial content has been displayed on the client device within a specified time window (e.g., within the last hour). The interstitial configuration object may cause the client device to enforce a global frequency cap (e.g., maximum interstitials per user per time unit) using local storage (e.g., a timestamp indicating last view time) of the client device. If the client device has not presented previous interstitial content within the specified time window, the interstitial configuration object may allow the rendered interstitial content to be revealed. If the client device has presented previous interstitial content within the specified time window, the interstitial configuration object may cause the rendered to be abandoned without presentation.

In some implementations, the client-side frequency check may be performed by a client device in response to a click event (e.g., when an instrumented link is clicked). Performing the client-side frequency check in response to a click event rather than at the time the interstitial content is requested may allow client devices 108 to check whether other interstitial content has been presented (e.g., in another tab) since the interstitial content was requested. In other implementations, the client-side frequency check may be performed at other times (e.g., before the interstitial content is requested, before the interstitial content is rendered, before the instrumented link is clicked, etc.).

Still referring to FIG. 3, memory 308 is shown to include an interstitial configuration object injector 318. Interstitial configuration object injector 318 may be configured to inject the interstitial configuration object into the content of the first resource. In some implementations, interstitial configuration object injector 318 embeds the interstitial configuration object (e.g., a snippet of computer-readable code) in a third-party content item delivered to the client device. In some implementations, interstitial configuration object injector 318 inserts the interstitial configuration object (e.g., along with the third-party content item) into a content frame of the first resource.

The interstitial configuration object may include a snippet of code which causes the client device to inject (e.g., via a postMessage from inside the content frame) an object representing publisher-specific configuration settings into the publisher domain of the first resource. The publisher-specific configuration settings may include selections made by the publisher of the first resource for presenting interstitial content, a listing of links to instrument, criteria for identifying links to instrument, and/or other options which can be adjusted by a publisher (e.g., via a management interface).

Still referring to FIG. 3, memory 308 is shown to include an interstitial event logging module 320. Event logging module 320 may be configured to receive event notifications from client devices 108. Event notifications may include a notification that interstitial content was presented on the client device, a notification that interstitial content was abandoned without presentation, an interaction between client devices 108 and the interstitial content, and/or other events associated with the rendering or presentation of interstitial content on client devices 108.

Event logging module 320 may update data in an interstitial presentation database in response to receiving an event notification from a client device. Event logging module 320 may record a time at which interstitial content was presented on the client device as well as other attributes of the presentation event (e.g., content provider information, publisher information, content item information, client device information, etc.). The updated interstitial presentation data may be used by frequency cap module 314 to limit subsequent presentations of interstitial content to the client device.

Figure 4:
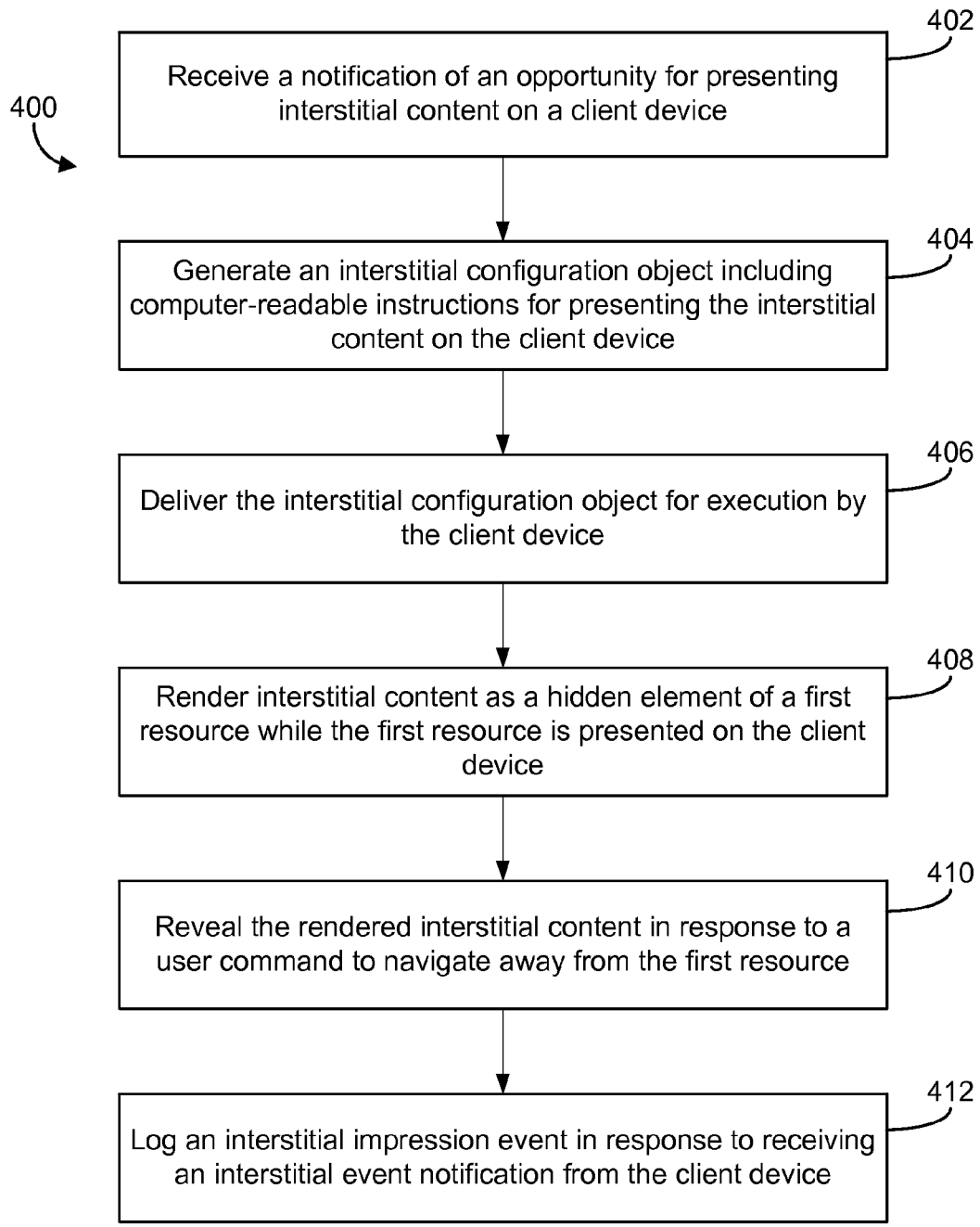
FIG. 4 is a flowchart of a process for providing interstitial content, according to a described implementation.

Referring now to FIG. 4, a flowchart of a process 400 for providing interstitial content is shown, according to a described implementation. Process 400 may be performed by content server 112 as described with reference to FIGS. 1-3. In process 400, interstitial content is loaded asynchronously with respect to the content of a first resource (e.g., a webpage that a user is currently viewing). For example, while the user is viewing the first resource, the interstitial content may be fully rendered as a hidden element of the first resource (e.g., in an invisible frame). The rendered interstitial content may remain invisible until a user command to navigate away from the first resource is received.

When the user initiates navigation away from the first resource (e.g., by clicking a link to a second resource), the fully-rendered interstitial content may be revealed. The interstitial content may be presented, for example, in an overlay frame which is modified to become visible in response to the user command to navigate away from the first resource. After the interstitial content is displayed, the user's browser may be automatically directed to a second resource. The second resource may be, for example, a webpage associated with the link which caused the interstitial content to be revealed.

Still referring to FIG. 4, process 400 is shown to include receiving a notification of an opportunity for presenting interstitial content on a client device (step 402). In some implementations, step 402 may be performed by impression notification module 310 as described with reference to FIG. 3. The notification of an opportunity for presenting interstitial content may be received from client devices 108 in conjunction with a notification of an available impression and/or a request for third-party content. In some implementations, the notification of an opportunity for presenting interstitial content may not specifically request an interstitial content item. Rather, the notification of an opportunity for presenting interstitial content may announce to content server 112 that interstitial content is capable of being displayed on a client device in association with an identified first-party resource.

In some implementations, step 402 includes receiving a notification of an available impression from client devices 108. For example, when client devices 108 load a first-party resource, an embedded content slot in the first-party resource (e.g., an embedded tag, a "show_ads" tag, etc.) may cause client devices 108 to request a third-party content item from content server 112. Client devices 108 may notify content server 112 of an available impression by requesting a third-party content item from content server 112. The notification of the available impression may include an indication of the first-party resource with which the third-party content item will be presented. For example, the notification of the available impression may include a webpage URL, a document URL, a domain name, or other indication of a particular first-party resource.

In some implementations, step 402 includes using the identity of the first-party resource to determine whether an opportunity exists for presenting interstitial content on a client device. For example, step 402 may include retrieving configuration settings for the identified resource from a configuration settings database (e.g., from data storage devices 110). The configuration settings may be set by a publisher of the identified resource (e.g., via a management interface) and may indicate whether the publisher has elected to display interstitial content in association with the identified resource.

Still referring to FIG. 4, process 400 is shown to include generating an interstitial configuration object including computer-readable instructions for presenting the interstitial content on the client device (step 404). In some implementations, step 404 may be performed by interstitial configuration object generator 316 as described with reference to FIG. 3. In some implementations, step 404 is performed in response to a determination (e.g., by frequency cap module 314) that another item of interstitial content can be presented to the client device in association with the first resource without exceeding an interstitial presentation threshold.

The interstitial configuration object may include computer-readable instructions which configure the client device to perform one or more operations associated with requesting, rendering, and/or presenting interstitial content on the client device. For example, step 404 may include generating an interstitial configuration object which causes the client device to create a new content element (e.g., an <ins> element, a hidden frame, etc.) and to insert the new element into the content of the first resource (e.g., into the document object model of the first resource). The interstitial configuration object may cause the client device to request interstitial content from content server 112 and to render the interstitial content. The interstitial configuration object may cause the client device to render the interstitial content in an invisible and/or hidden element of the first resource. The interstitial content may be rendered in an invisible frame of the first resource while the first resource is being viewed by the client device.

The interstitial configuration object may cause the client device to instrument one or more elements of the first resource. In some implementations, the interstitial configuration object contains instructions for identifying elements of the first resource to instrument. For example, the interstitial configuration object may include instructions for identifying elements of the first resource which cause client devices to navigate to another resource on the same domain as the first resource (e.g., links and/or anchor tags which have a non-empty href attribute referencing another resource on the same domain). In some implementations, the interstitial configuration object includes instructions for identifying elements of the first resource which have no explicit on-click handler. The interstitial configuration object may cause the client device to instrument elements of the first resource which cause a navigation to another resource on the same domain and/or which have no explicit on-click handler.

Instrumenting an element of the first resource may include appending content to the element, modifying the element, or otherwise changing the element. In some implementations, instrumenting an element of the first resource includes attaching a click event handler to each instrumented element. The click event handler may be configured to detect a user interaction with an element to which the click event handler is attached. For example, the click event handler may detect a user clicking on one of the instrumented elements. The click event handler may be configured to cancel any navigation away from the first resource which would normally be caused by selecting an instrumented element. The click event handler may also be configured to reveal the interstitial content when the instrumented element is selected.

The interstitial configuration object may cause the client device to reveal the rendered interstitial content in response to a user command to navigate away from the first resource. For example, the interstitial content may be revealed in response to a user clicking on an instrumented link of the first resource. In some implementations, revealing the rendered interstitial content includes modifying the invisible frame in which the interstitial content is rendered. The invisible frame may be modified to become visible in response to the click event. In some implementations, the interstitial content is presented in an iframe overlay on the first resource. The overlay in which the interstitial content is presented may be opaque in order to mimic the appearance of a separate resource and/or webpage. However, the frame in which the interstitial content is presented may be an element of the first resource which is modified to become visible in response to the click event.

In some implementations, the interstitial configuration object causes the client device to reveal the rendered interstitial content only when the user command to navigate away from the first resource is a command to navigate to another resource associated with the same publisher as the first resource. For example, a transition from a first resource (e.g., a first webpage) to a second resource (e.g., a second webpage) may trigger presentation of the interstitial content only the first resource and the second resource are provided by the same publisher (e.g., part of the same website, part of the same domain, etc.). A transition between two resources provided by the same publisher can be detected by matching the full hostname of the href attribute of the clicked element (i.e., the hostname of the second resource) to the hostname of resource currently being viewed (i.e., the hostname of the first resource).

The interstitial configuration object may cause the client device to perform a client-side frequency check. The client-side frequency check performed by a client device may include determining whether interstitial content has been displayed on the client device within a specified time window (e.g., within the last hour). The interstitial configuration object may cause the client device to enforce a global frequency cap (e.g., maximum interstitials per user per time unit) using local storage (e.g., a timestamp indicating last view time) of the client device. For example, if the client device has not presented previous interstitial content within the specified time window, the interstitial configuration object may allow the rendered interstitial content to be revealed. If the client device has presented previous interstitial content within the specified time window, the interstitial configuration object may cause the rendered to be abandoned without presentation.

In some implementations, the client-side frequency check may be performed by a client device in response to a click event (e.g., when an instrumented link is clicked). Performing the client-side frequency check in response to a click event rather than at the time the interstitial content is requested may allow client devices 108 to check whether other interstitial content has been presented (e.g., in another tab) since the interstitial content was requested. In other implementations, the client-side frequency check may be performed at other times (e.g., before the interstitial content is requested, before the interstitial content is rendered, before the instrumented link is clicked, etc.).

Still referring to FIG. 4, process 400 is shown to include delivering the interstitial configuration object for execution by the client device (step 406). In some implementations, step 406 is performed by interstitial configuration object injector 318, as described with reference to FIG. 3. Step 406 may include injecting the interstitial configuration object into the content of the first resource. In some implementations, step 406 includes embedding the interstitial configuration object (e.g., a snippet of computer-readable code) in a third-party content item delivered to the client device. In some implementations, step 406 includes inserting the interstitial configuration object (e.g., along with the third-party content item) into a content frame of the first resource.

The interstitial configuration object may include a snippet of code which causes the client device to inject (e.g., via a postMessage from inside the content frame) an object representing publisher-specific configuration settings into the publisher domain of the first resource. The publisher-specific configuration settings may include, for example, selections made by the publisher of the first resource for presenting interstitial content, a listing of links to instrument, criteria for identifying links to instrument, and/or other options which can be adjusted by a publisher (e.g., via a management interface).

Still referring to FIG. 4, process 400 is shown to include rendering the interstitial content as a hidden element of the first resource while the first resource is presented on the client device (step 408). In some implementations, step 408 may be performed by client devices 108 according to instructions provided in the interstitial configuration object received from content server 112. Client devices 108 may render the interstitial content in an invisible and/or hidden element of the first resource. The interstitial content may be rendered in an invisible frame of the first resource while the first resource is being viewed by the client device.

Still referring to FIG. 4, process 400 is shown to include revealing the rendered interstitial content in response to a user command to navigate away from the first resource (step 410). In some implementations, step 410 may be performed by client devices 108 according to instructions provided in the interstitial configuration object received from content server 112. In some implementations, step 410 includes modifying the invisible frame in which the interstitial content is rendered. The invisible frame may be modified to become visible in response to a click event or other user command to navigate away from the first resource.

In some implementations, step 410 includes presenting the interstitial content in an iframe overlay on the first resource. The overlay in which the interstitial content is presented may be opaque in order to mimic the appearance of a separate resource and/or webpage. However, the frame in which the interstitial content is presented may be an element of the first resource which is modified to become visible in response to the click event.

In some implementations, step 410 is performed only when the user command to navigate away from the first resource is a command to navigate to another resource associated with the same publisher as the first resource. For example, a transition from a first resource (e.g., a first webpage) to a second resource (e.g., a second webpage) may trigger presentation of the interstitial content only the first resource and the second resource are provided by the same publisher (e.g., part of the same website, part of the same domain, etc.). A transition between two resources provided by the same publisher can be detected by matching the full hostname of the href attribute of the clicked element (i.e., the hostname of the second resource) to the hostname of resource currently being viewed (i.e., the hostname of the first resource).

Still referring to FIG. 4, process 400 is shown to include logging an interstitial impression event in response to receiving an interstitial event notification from the client device (step 412). Step 412 may be performed by content server 112 in response to receiving an interstitial event notification from client devices 108. The interstitial event notification may be sent from client devices 108 to content server 112 in response to revealing the rendered interstitial content in step 410. The interstitial event notification may notify content server 112 that the interstitial content was presented on client devices 108 (e.g., made visible on screen).

Content server 112 may use the interstitial event notification to determine that an interstitial impression event has occurred. Until the interstitial event notification is received at content server 112, content server 112 may be unaware whether the interstitial content was actually presented on client devices 108. For example, the interstitial content may be discarded without presentation if a user of client devices 108 closes the browser window, clicks the back button, or clicks on a link that does not trigger the interstitial content to be revealed (e.g., clicking on a link to a webpage from a different publisher). The interstitial event notification informs content server 112 that the interstitial content was presented on client devices 108.

In some implementations, step 412 includes logging the interstitial event in data storage devices 110. A logged interstitial event may include a content item attribute (e.g., identifying a particular content item presented as interstitial content), a device identifier or user identifier attribute (e.g., identifying a particular client device or user profile associated with the interstitial event), a content provider attribute (e.g., identifying a particular third-party content provider associated with the interstitial content), a time attribute, and/or other attributes associated with the impression event.

In some implementations, step 412 includes billing content providers 106 for presentations of interstitial content. Content server 112 may bill a content provider for a presentation of interstitial content in response to receiving an interstitial event notification identifying the content provider or a third-party content item associated with the content provider and/or in response to logging an interstitial impression event associated with the content provider.

Content server 112 may use logged interstitial events as a source of data when performing a server-side frequency cap check. For example, content server 112 may check interstitial event logs to determine whether an interstitial content item can be presented on a client device without exceeding a maximum presentation frequency threshold (e.g., a predetermined number of interstitial content items per unit time).

In some implementations, the user command to navigate away from the first resource is a command to navigate from the first resource to a second resource. In some implementations, process 400 includes pre-rendering the second resource in response to revealing the rendered interstitial content. Pre-rendering the second resource may be performed while the interstitial content is presented on the client device. In some implementations, process 400 includes automatically navigating to the second resource after the interstitial content is presented on the client device.

Implementations of the subject matter and the operations described in this specification may be implemented in digital electronic circuitry, or in computer software, firmware, or hardware, including the structures disclosed in this specification and their structural equivalents, or in combinations of one or more of them. Implementations of the subject matter described in this specification may be implemented as one or more computer programs, i.e., one or more modules of computer program instructions, encoded on one or more computer storage medium for execution by, or to control the operation of, data processing apparatus. Alternatively or in addition, the program instructions may be encoded on an artificially generated propagated signal (e.g., a machine-generated electrical, optical, or electromagnetic signal) that is generated to encode information for transmission to suitable receiver apparatus for execution by a data processing apparatus. A computer storage medium may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially generated propagated signal. The computer storage medium may also be, or be included in, one or more separate components or media (e.g., multiple CDs, disks, or other storage devices). Accordingly, the computer storage medium is both tangible and non-transitory.

The operations described in this disclosure may be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a standalone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for example, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

While this specification contains many specific implementation details, these should not be construed as limitations on the scope of any disclosures or of what may be claimed, but rather as descriptions of features specific to particular implementations of particular disclosures. Certain features that are described in this disclosure in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products embodied on one or more tangible media.

The features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

Thus, particular implementations of the subject matter have been described. Other implementations are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The construction and arrangement of the systems and methods as shown in the various illustrated implementations are examples only. Although only a few implementations have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative implementations. Other substitutions, modifications, changes, and omissions may be made in the design, operating conditions and arrangement of the exemplary implementations without departing from the scope of the present disclosure.

The present disclosure contemplates methods, systems and program products on any machine-readable media for accomplishing various operations. The implementations of the present disclosure may be implemented using existing computer processors, or by a special purpose computer processor for an appropriate system, incorporated for this or another purpose, or by a hardwired system. Implementations within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for presenting interstitial content, the method comprising:
   receiving, at a content server, a notification of an opportunity for presenting interstitial content on a client device;
   generating, by the content server, an interstitial configuration object comprising computer-readable instructions executable on the client device for presenting the interstitial content on the client device; and
   delivering, by the content server in response to receiving the notification, to the client device, the interstitial configuration object including computer-executable instructions which, when executed on the client device, causes the client device to:
      insert a resource element for presenting the interstitial content into a first resource while the first resource is presented on the client device, the resource element having a visibility property initially set to a first value that restricts the interstitial content from display on the first resource,
      include the interstitial content into the resource element, subsequent to receiving the interstitial content from the content server, and
      set the visibility property of the resource element to a second value that causes the interstitial content to be displayed on the first resource, in response to a user command to navigate away from the first resource.

2. The method of claim 1, wherein the user command to navigate away from the first resource is a command to navigate from the first resource to a second resource;
   wherein the interstitial configuration object causes the client device to automatically navigate to the second resource after the interstitial content is presented on the client device.

3. The method of claim 2, wherein the interstitial configuration object causes the client device to pre-render the second resource in response to revealing the interstitial content.

4. The method of claim 1, wherein the interstitial configuration object causes the client device to modify an element of the first resource to include a click event handler;
   wherein the click event handler causes the client device to cancel navigation to a second resource associated with the modified element and to reveal the interstitial content in response a user command selecting the modified element.

5. The method of claim 1, further comprising:
   determining whether the user command to navigate away from the first resource is a command to navigate to a second resource on a same domain as the first resource;
   wherein the interstitial configuration object causes the client device to reveal the interstitial content in response to a determination that the user command to navigate away from the first resource is the command to navigate to the second resource on the same domain as the first resource.

6. The method of claim 1, further comprising:
   receiving, at the content server, a request for non-interstitial content from the client device, wherein the request for non-interstitial content includes the notification of the opportunity for presenting interstitial content on the client device; and
   delivering a non-interstitial content item to the client device in conjunction with the interstitial configuration object;
   wherein the interstitial configuration object causes the client device to display the non-interstitial content item concurrently with the first resource.

7. The method of claim 1, further comprising:
   receiving, at the content server, a request for interstitial content from the client device, wherein the request for interstitial content is received in response to at least one of:
      the client device executing the interstitial configuration object, and
      the client device executing an interstitial content request tag of the first resource.

8. The method of claim 1, further comprising:
   retrieving, by the content server, configuration settings from a data storage device, wherein the configuration settings are adjustable by a publisher of the first resource; and
   using the configuration settings to determine whether the publisher has elected to display the interstitial content in conjunction with the first resource;
   wherein generating the interstitial configuration object is performed in response to a determination that the publisher has elected to display the interstitial content in conjunction with the first resource.

9. The method of claim 1, further comprising:
   determining, by the content server, a frequency at which the interstitial content has been presented on the client device;
   wherein generating the interstitial configuration object is performed in response to a determination that the frequency with which interstitial content has been presented on the client device does not exceed a frequency threshold.

10. The method of claim 1, wherein the interstitial configuration object causes the client device to determine a frequency at which the interstitial content has been presented on the client device;
    wherein the interstitial configuration object causes the client device to render the interstitial content and to reveal the interstitial content in response a determination that the frequency at which the interstitial content has been presented on the client device does not exceed a frequency threshold.

11. The method of claim 10, wherein the interstitial configuration object causes the client device to determine the frequency at which the interstitial content has been presented on the client device in response to the user command to navigate away from the first resource.

12. A system for presenting interstitial content, the system comprising:
    a computing system configured to:
       receive a notification of an opportunity for presenting interstitial content on a client device;
       generate an interstitial configuration object executable on the client device for presenting the interstitial content on the client device;
       deliver, in response to receiving the notification, to the client device, the interstitial configuration object includes computer-executable instructions which, when executed on the client device causes the client device to
          insert a resource element for presenting the interstitial content into a first resource while the first resource is presented on the client device, the resource element having a visibility property initially set to a first value that restricts the interstitial content from display on the first resource;

include the interstitial content into the resource element, subsequent to receiving the interstitial content from the content server; and set the visibility property of the resource element to a second value that causes the interstitial content to be displayed on the first resource, in response to a user command to navigate away from the first resource.

13. The system of claim 12, wherein the user command to navigate away from the first resource is a command to navigate from the first resource to a second resource;

wherein the computing system is configured to automatically navigate to the second resource after the interstitial content is presented on the client device.

14. The system of claim 12, wherein the computing system is configured to modify an element of the first resource to include a click event handler;

wherein the computing system is configured to cancel navigation to a second resource associated with the modified element and to reveal the interstitial content in response a user command selecting the modified element.

15. The system of claim 12, wherein the computing system is configured to determine whether the user command to navigate away from the first resource is a command to navigate to a second resource on a same domain as the first resource;

wherein the computing system is configured to reveal the interstitial content in response to a determination that the user command to navigate away from the first resource is the command to navigate to the second resource on the same domain as the first resource.

16. The system of claim 12, wherein the computing system is configured to:

determine whether interstitial content presentation frequency exceeds a frequency threshold; and reveal the interstitial content in response a determination that the interstitial content presentation frequency does not exceed the frequency threshold.

17. A system for providing interstitial content, the system comprising:

a content server configured to:

receive a notification of an opportunity for presenting interstitial content on a client device;

generate an interstitial configuration object comprising computer-readable instructions for presenting the interstitial content on the client device;

deliver, in response to receiving the notification, to the client device, the interstitial configuration object for execution by the client device, wherein the interstitial configuration object, when executed on the client device, causes the client device to:

insert a resource element for presenting the interstitial content into a first resource while the first resource is presented on the client device, the resource element having a visibility property initially set to a first value that restricts the interstitial content from display on the first resource;

include the interstitial content into the resource element, subsequent to receiving the interstitial content from the content server, and set the visibility property of the resource element to a second value that causes the interstitial content to be displayed on the first resource, in response to a user command to navigate away from the first resource.

18. The system of claim 17, wherein the interstitial configuration object causes the client device to modify an element of the first resource to include a click event handler;

wherein the click event handler causes the client device to cancel navigation to a second resource associated with the modified element and to reveal the interstitial content in response a user command selecting the modified element.

* * * * *